Jan. 3, 1961 C. M. PETERS 2,966,927
PRESSURE RESPONSIVE PILOT VALVE FOR VALVE MOTOR OPERATION
Filed June 21, 1957
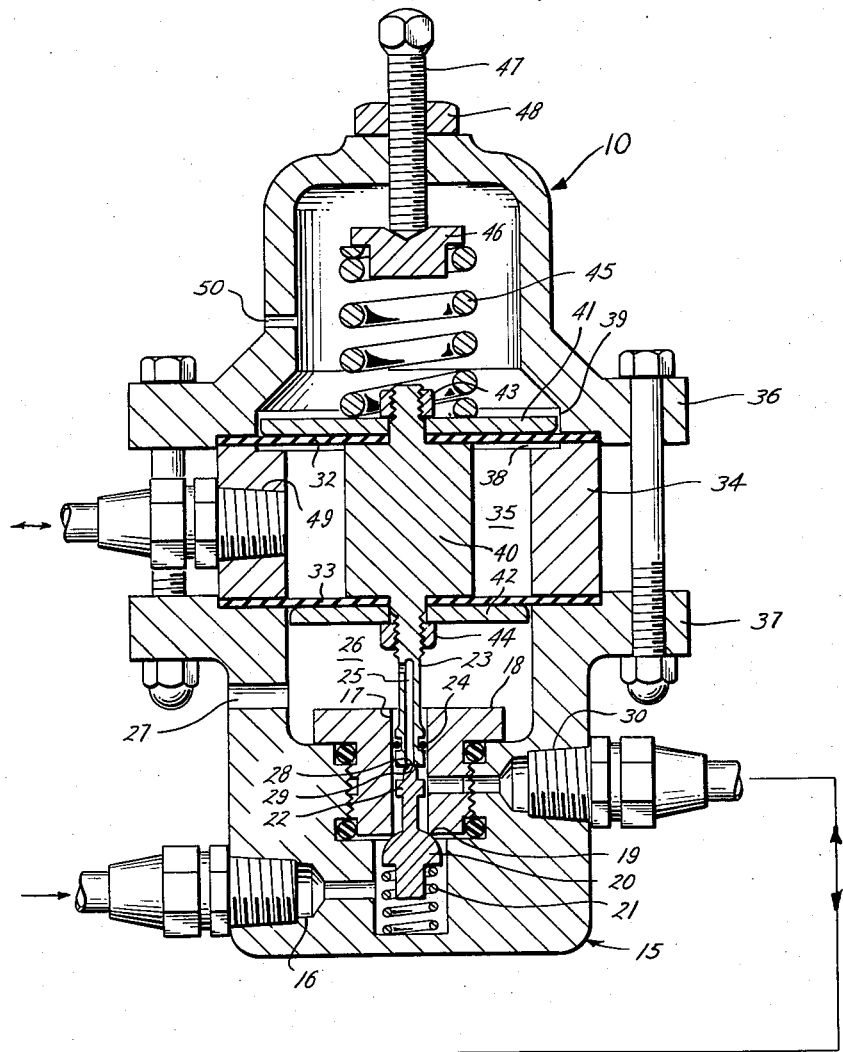
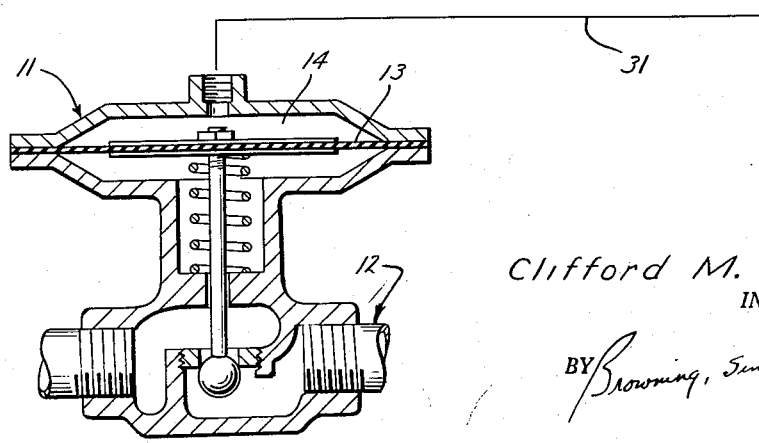
Clifford M. Peters
INVENTOR.
BY
ATTORNEYS United States Patent Office 2,966,927
Patented Jan. 3, 1961

2,966,927

PRESSURE RESPONSIVE PILOT VALVE FOR VALVE MOTOR OPERATION

Clifford M. Peters, Longview, Tex., assignor to U.S. Industries, Inc., New York, N.Y.

Filed June 21, 1957, Ser. No. 667,100

5 Claims. (Cl. 137—620)

This invention relates to new and useful improvements in pilot valves finding particular use, for example, in operating pressure actuated motor valves responsive to changes in a control pressure.

In the operation of pressure actuated motor valves, it is common to employ a pilot valve to regulate the supply pressure applied to the motor valve in accordance with variations in a control pressure. The control pressure may be derived from the upstream or downstream side of the motor valve or from another source depending upon the particular installation. At any rate, it is used to operate the pilot valve so that varying degrees of supply pressure is applied to the motor valve to cause it to open and close to maintain a desired flow or pressure condition in the line in which it is situated. Such a pilot valve finds particular use where the supply pressure necessary for proper operation of the motor valve differs considerably from the control pressure in accordance with which the motor valve is to be controlled. In such cases, the pilot valve can be said to be a pressure multiplier or divider. Thus many motor valves are designed to use a supply pressure range of 0 to 30 p.s.i. for movement between fully open and fully closed positions. The control pressure, on the other hand, may be of a considerably different magnitude, e.g. 100 p.s.i. In such a situation, the pilot valve is operated by the 100 p.s.i. control pressure to vary the supply pressure over the 0 to 30 p.s.i. range in a manner that the control pressure is maintained at the desired 100 p.s.i.

Also, the pilot valve can serve as an "over pressure cut-off" in that it will apply supply gas to the motor valve to hold it in open position as long as the flow line pressure downstream of the motor valve is below a desired value. However, upon the line pressure exceeding such value, the pilot valve will cause the motor valve to close and remain closed until the line pressure falls below such value. Such a system is particularly useful in protecting the gathering lines of oil wells from excessive pressures.

In the past, the pilot valves have not been as sensitive as desired and have caused some lag or even hunting of the control system. Thus, the closest control of the motor valve will be secured only when the pilot valve has essentially no lag and when it is influenced by substantially only the control pressure and not by the supply pressure.

It is an object of this invention to provide an improved pilot valve of the type above referred to and which is very sensitive to control pressure variations and is substantially unaffected by variations in supply pressure being applied to the motor valve whereby any tendency for the pilot valve to hunt or lag is substantially eliminated.

Another object is to provide such a pilot valve which is of the "non-bleed" type in that supply pressure fluid is not continuously bled to the atmosphere but only during those intervals in which the pressure applied to the motor valve is being decreased.

Another object is to provide a pilot valve particularly useful in controlling the operation of motor valves, the valve being so constructed and arranged that it is substantially insensitive to the supply pressure fluid being applied to or bled from the motor valve so that operation of the pilot valve is governed substantially only by control fluid pressure and not by its own output.

Another object is to provide a pilot valve in which a pair of co-acting but separate valve members are used to control the application and venting of supply pressure to and from a motor valve and wherein a pressure responsive means controlling the operation of the valve members responsive to a control pressure is effectively isolated from the influence of the supply pressure so that the pilot valve is sensitive substantially only to the control pressure whereby changes in the supply pressure are ineffective to govern the operation of the pilot valve.

Other objects, advantages and features of this invention will be apparent to one skilled in the art upon a consideration of the written specification, the appended claims and the attached drawing wherein there is illustrated a preferred embodiment of a pilot valve, the latter being shown connected to a motor valve to control the operation of the same.

Referring now to the drawing, the preferred embodiment of the pilot valve 10 is shown connected to a motor valve 11 which controls flow through a pipe 12. The motor valve can be of conventional construction and suffice it to say that the application of supply pressure to its diaphragm 13 will cause the motor valve to move toward open position and the venting of supply pressure from the diaphragm will cause it to move toward closed position. It is the function of the pilot valve to regulate the supplying and venting of control pressure fluid to and from chamber 14 of the motor valve on one side of diaphragm 13 in such a manner as to control the degree of opening of the motor valve in accordance with variations in a control pressure.

The pilot valve mechanism includes a body 15 having a supply pressure inlet port 16 which can be connected to any suitable source of supply pressure to be transmitted to the motor valve to control its operation. The body also has a bore 17, here shown to be in a seat fitting 18, and surrounded by a valve seat 19. A valve member 20 cooperates with seat 19 to control flow from port 16 into bore 17. As here illustrated, the valve member is urged towards seated position by suitable resilient means such as spring 21. It also has a portion 22 exposed to the bore for cooperation with another valve member or element 23. Valve element 23 has a sliding seal with bore 17 and this is shown here as an O-ring. It also has a vent passage 25 by-passing the sliding seal and affording communication between the bore intermediate seal 24 and seat 19 and the exterior of the valve, i.e. to atmosphere. In this connection, it will be noted that chamber 26 of the valve body is vented to atmosphere through a vent 27. The vent passage is here shown as terminating at 28 in the lower end of valve element 23 with the terminus being situated and constructed so that it acts as a seat cooperable with portion 29 of valve member 20 to close the vent passage upon proper reciprocating movement of the valve element.

The body also has a second port 30 which is connectable, as by a suitable conduit 31, to chamber 14 of the motor valve. Port 30, it will be noted, communicates with bore 17 intermediate seal 24 and seat 19.

It will be evident from the foregoing description that upon valve element 23 moving upwardly, port 30 will be vented via passage 25 and vent 27 to thereby decrease the pressure in chamber 14 of the motor valve. Upon movement of valve element 23 toward valve member 20, it will first seat terminus 28 of passage 25 on portion 29 of the valve member thereby closing the vent passage. Upon a very small amount of additional movement, the valve element will unseat valve member 20 from seat 19. This permits supply pressure from port 16 to flow through port 30 to the motor valve to increase the pressure applied to the diaphragm.

The valve body is also provided with pressure responsive means constructed and arranged for movement responsive to variations in a control pressure applied thereto and, in accordance with such movement, to position valve element 23 to control the application of supply pressure to the motor valve and also the venting thereof. For the purpose of decreasing friction and increasing the sensitivity of the pilot valve, the pressure responsive means preferably comprises a pair of diaphragms 32 and 33 which together with ring segment 34, form a control pressure chamber 35 in the valve body. It will be noted the diaphragms are clamped in place by bonnet 36 being bolted to valve fitting 37. Ring element 34 is recessed as at 38 and bonnet 36 is provided with a correspondingly sized portion 39 so that the upper diaphragm 32 has a larger effective area than does lower diaphragm 33.

The two diaphragms are connected for simultaneous movement by connector 40, follower plates 41 and 42 and nuts 43 and 44. As a part of the pressure responsive means, a control spring 45 is situated in bonnet 36 with one end bearing against follower plate 41 and the other against a spring follower 46. An adjustable control screw 47 is threaded to the bonnet through a lock-nut 48 to bear against spring follower 46 whereby the degree of compression of spring 45 and hence the force it exerts against the diaphragm assembly can be regulated or adjusted.

From this description, it can be seen that upon application of a control pressure through port 49, such pressure will tend to move the diaphragms 32 and 33 upwardly against the counterforce of spring 45. As soon as the control pressure increases sufficiently to overcome the force of spring 45, the diaphragms will move valve element 23 upwardly to unseat it from the valve member 20 thereby venting port 30 via passage 25 as above-described. Upon a decrease in pressure in chamber 35, the diaphragms will move downwardly thereby moving valve element 23 downwardly to close vent passage 25 and subsequently unseat valve member 20 to permit flow of supply pressure fluid to motor valve 11. Thus by suitable adjustment of control spring 45, the pressure to be maintained at port 30 and hence in chamber 14 of motor valve 11 can be adjusted. Any change in control pressure from that required to keep vent passage 25 closed and valve member 20 seated will result in either opening the vent passage or unseating of the valve member to respectively decrease and increase the pressure applied to the motor valve.

It has been found that the sensitivity of the pilot valve mechanism can be greatly increased by making the seating surfaces between valve member 20 and seat 19 and between end 28 and portion 29 of the metal-to-metal type. With such arrangement, only a few thousandths of an inch of diaphragm travel is required to unseat valve member 20 after passage 25 has been closed, and vice versa. This means that only extremely small changes of control fluid pressure in chamber 35 are required to shut off the supply gas flowing to the diaphragm and thereafter vent the motor valve.

It will be noted that the valve body has a vent 50 which assures the pressure applied to the upper side of diaphragm 32 is atmospheric. It is important to note that the outer sides of both of diaphragms 32 and 33 are vented to atmosphere and that neither is subject to the pressure of supply fluid flowing through either of ports 16 or 30. Of course, upon venting through passage 25, supply pressure fluid will flow into chamber 26 but by making vent 27 of suitably large size, the pressure in chamber 26 during venting will not measurably increase.

With this construction, it can be seen that neither of diaphragms 32 or 33 will be affected by variations in supply pressure in port 30. Accordingly, the pilot valve mechanism and the supply of pressure and venting of motor valve 11 is substantially under the sole control of the control pressure in chamber 35.

The control pressure can be derived from any desired control point, e.g. from pipe 12 upstream or downstream of motor valve 11, a pressure vessel feeding into pipe 12 or vice versa, etc. Where the control fluid pressure is to be maintained constant, control spring 45 is adjusted to give the motor valve opening necessary to achieve the control pressure. Also, the pilot valve can be used as an "over pressure cut-off" by connecting port 49 to the pipe 12 downstream of the motor valve and adjusting spring 45 so that the pilot valve will vent the motor valve when the control pressure exceeds a pre-determined value. When the control pressure is less than this value, supply gas will flow through the pilot valve to hold the motor valve open.

It will be noted that the pilot valve does not bleed supply pressure fluid to the atmosphere except only when the control pressure falls below the set-point and then only during the interval the motor valve is closing to raise the control pressure. Thus, there is no continuous bleed of supply pressure as is common to many motor valve control systems.

While the pilot valve has been described as an indirect acting type, i.e. an increase in control pressure vents the motor valve, it can be made to be of the direct acting type. To do this, it is merely necessary to make diaphragm 33 of larger effective area than diaphragm 32 and then to cause spring 45 to exert an upward force on the diaphragms. This can be done either by making spring 45 a tension spring or by placing it in chamber 26 and using it as a compression spring.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A pilot valve which comprises, in combination, a body, a flow port in the body and a bore connected to the port, a valve seat surrounding the bore, a pair of valve members one of which is movable toward and away from said seat to control flow from said port into said bore, a second valve member having a sliding seal with said bore and a passage by-passing the seal and providing fluid communication between the exterior of the body and the bore intermediate said seal and seat, a second port communicating with the bore intermediate the seal and seat, the second valve member being movable in one direction toward the first valve member to seat therewith and seal off the passage and then to unseat the first valve member to provide communication between the ports, and upon movement in the opposite direction to first seat the first valve member with said valve seat to interrupt flow between the ports and then to move away from the first valve member to open said passage to said second port, and pressure responsive means connected to said second valve member to move the same as aforesaid responsive to changes in a control pressure applied to the pressure responsive means, said pressure responsive means comprising a pair of spaced interconnected diaphragms of different effective areas forming a pressure chamber therebetween, a port for admitting control pressure to said chamber, and resilient means opposing movement of the diaphragms under the influence of increased pressure in said chamber, the body having vent openings providing continuous fluid communication between the sides of the diaphragms exteriorly of the chamber and the exterior of the body.

2. A pilot valve which comprises, in combination, a body, a pair of spaced interconnected diaphragms of different effective areas carried by the body to define a closed control pressure chamber therebetween, said body providing openings continuously venting the exterior of the diaphragms to the exterior of the body, resilient means opposing movement of the diaphragms under the influence of increased pressure in said chamber, a valve element connected to the diaphragms for movement thereby and being reciprocally disposed in a bore in said body, a sliding seal between said valve element and bore isolating said diaphragms from pressure within said bore, said valve element having a vent passage therein terminating at the end of the valve element within said bore and also by-passing the seal and communicating with the exterior of the body, a valve member seatable across said bore, means resiliently urging the valve member toward seated position, ports in the body one of which communicates with said bore through said seat and the other with the bore intermediate said seat and seal, said valve element being movable responsive to a decrease in pressure in said chamber toward the valve member to seat the valve member across said vent passage to close the latter and then moving the valve member in unison therewith to unseat the valve member and permit flow between said ports, the valve element also then being movable responsive to an increase in pressure in said chamber to first permit the resiliently urging means to seat the valve member and then to move away from the valve member to vent said port communicating with the bore intermediate said seat and seal.

3. The valve of claim 2 wherein the seating surfaces between said valve member and its seat with said bore and between said valve element and valve member are metal-to-metal so that said vent passage is closed and said valve member is unseated substantially simultaneously and vice versa.

4. A pilot valve which comprises, in combination, a body, a pressure responsive member and a seal means carried by the body and together forming a control pressure chamber, said body having a valving portion spaced from the pressure responsive member with a space therebetween with an opening in the body continuously venting such space to the atmosphere exteriorly of the body, a bore in the valving portion, a valve element having a sliding seal with said bore and connected to said pressure responsive member, said valve element extending across said space, a vent passage in the valve element by-passing the sliding seal and when open venting the bore to the exterior of the body, a valve member and seat controlling flow into the bore from a port in the body, a second port in the body providing communication between the exterior of the body and the bore intermediate the seat and sliding seal, said valve element being movable in said bore by the pressure responsive member toward the valve member to seat first therewith and close said vent passage and then to unseat the valve member and permit flow between said ports and then being movable in a direction away from the valve member to first seat the same to interrupt flow between the ports and then to unseat from the valve member to open said vent passage to vent the second port, all responsive to predetermined changes in pressure in said chamber.

5. A pilot valve which comprises, in combination, a body, a pair of drivingly interconnected spaced diaphragms carried by the body to define a control pressure chamber therebetween, a port for admitting control pressure into said chamber, said body having a valving portion spaced from said diaphragms and a space between the valving portion and the diaphragms, means continuously venting such space to the exterior of the body, a pair of ports connected by a fluid passageway in said valving portion, and valve means in said valving portion for controlling pressure in one port of said pair of ports and having an actuating connection therefor extending across said space to said diaphragms and including a vent passage for venting said one port, said valve means, upon continued movement of the diaphragm in one direction, first closing said vent passage and then opening said fluid passageway for fluid flow between said pair of ports and, upon continued movement in an opposite direction, first interrupting flow between said pair of ports and then opening said vent passage to said one port to vent the same, whereby pressure in said one port is controlled by pressure in said chamber independently of pressure in said fluid passageway.

References Cited in the file of this patent

UNITED STATES PATENTS

| | | |
|---|---|---|
| 1,645,751 | Groffensberger | Oct. 18, 1927 |
| 2,185,449 | Veenschoten | Jan. 2, 1940 |
| 2,313,991 | Fitch | Mar. 16, 1943 |
| 2,404,281 | Eaton | July 16, 1946 |
| 2,435,546 | Mercier | Feb. 3, 1948 |
| 2,589,019 | Neuroth | Mar. 11, 1952 |
| 2,618,286 | Johnson | Nov. 18, 1952 |
| 2,635,618 | Moore | May 21, 1953 |
| 2,665,554 | Rockwell | Jan. 12, 1954 |
| 2,712,321 | Grogan | July 5, 1955 |
| 2,718,876 | Williams et al. | Sept. 27, 1955 |
| 2,731,024 | Williams | Jan. 17, 1956 |
| 2,753,885 | White | Aug. 10, 1956 |
| 2,803,258 | Dyson | Aug. 20, 1957 |
| 2,815,042 | Passaggio | Dec. 3, 1957 |
| 2,825,354 | Du Bois | Mar. 4, 1958 |
| 2,825,361 | Seljos | Mar. 4, 1958 |